United States Patent
Forneck et al.

(10) Patent No.: US 8,057,832 B2
(45) Date of Patent: *Nov. 15, 2011

(54) MICROWAVABLE FOOD PRODUCTS

(75) Inventors: Keith Daniel Forneck, Chicago, IL (US); Sophia Pai, Lombard, IL (US); Renee Gan, Chicago, IL (US)

(73) Assignee: Kraft Foods Global Brands LLC, Northfield, IL (US)

( * ) Notice: Subject to any disclaimer, the term of this patent is extended or adjusted under 35 U.S.C. 154(b) by 768 days.

This patent is subject to a terminal disclaimer.

(21) Appl. No.: 11/531,578

(22) Filed: Sep. 13, 2006

(65) Prior Publication Data

US 2008/0063758 A1    Mar. 13, 2008

(51) Int. Cl.
 *B65D 85/00* (2006.01)
(52) U.S. Cl. ............. 426/120; 426/19; 426/20; 426/62; 426/94; 426/106; 426/119; 426/128; 426/549
(58) Field of Classification Search .................. 426/120, 426/119, 19, 20, 62, 94, 106, 128, 549
See application file for complete search history.

(56) References Cited

U.S. PATENT DOCUMENTS

| | | | |
|---|---|---|---|
| 2,011,383 A | 8/1935 | Taylor | |
| 3,023,104 A | 2/1962 | Battista | |
| D205,126 S * | 6/1966 | Haessler | D1/122 |
| 3,390,766 A | 7/1968 | Stockdale | |
| 3,414,414 A | 12/1968 | Christine et al. | |
| 3,809,221 A | 5/1974 | Compere | |
| 3,865,301 A | 2/1975 | Pothier et al. | |
| 3,876,794 A | 4/1975 | Rennhard | |
| 4,013,798 A | 3/1977 | Goltsos | |
| 4,015,085 A | 3/1977 | Woods | |
| 4,034,125 A * | 7/1977 | Ziemke et al. | 426/650 |
| 4,042,714 A | 8/1977 | Torres | |
| 4,100,302 A | 7/1978 | Theimer et al. | |
| 4,133,896 A | 1/1979 | Standing et al. | |
| 4,137,333 A | 1/1979 | Daswick | |
| 4,190,757 A | 2/1980 | Turpin et al. | |
| 4,207,348 A | 6/1980 | Vermilyea et al. | |
| 4,456,625 A | 6/1984 | Durst | |
| 4,461,782 A | 7/1984 | Robbins et al. | |
| 4,511,585 A | 4/1985 | Durst | |

(Continued)

FOREIGN PATENT DOCUMENTS

AU    86700/91 B    8/1992

(Continued)

OTHER PUBLICATIONS

Barbara M. Lund et al., The Microbiological Safety and Quality of Food, 2000, Aspen Publishers, vol. I-II, p. 774 (4 pages).

(Continued)

*Primary Examiner* — Brent T O'Hern (74) *Attorney, Agent, or Firm* — Fitch, Even, Tabin & Flannery (57) ABSTRACT

The packaging system includes a first food product sealed within an inner wrapper, a second food product positioned within a tray and spacing the first food product from the tray, and an outer wrapper sealing the first food product, sealed within the inner wrapper, the second food product and the tray therein. A shield is disposed on the tray and is in contact with more than one surface of the second food product. Prior to microwave heating, the inner and outer wrapper are removed.

6 Claims, 5 Drawing Sheets

U.S. PATENT DOCUMENTS

| | | | |
|---|---|---|---|
| 4,582,711 A | 4/1986 | Durst | |
| 4,585,501 A | 4/1986 | Overholt | |
| 4,589,568 A | 5/1986 | Ito et al. | |
| 4,590,076 A | 5/1986 | Titcomb et al. | |
| 4,668,519 A | 5/1987 | Dartey et al. | |
| 4,721,622 A | 1/1988 | Kingham et al. | |
| 4,735,811 A | 4/1988 | Skarra et al. | |
| 4,857,353 A | 8/1989 | Jackson et al. | |
| 4,885,180 A | 12/1989 | Cochran et al. | |
| 4,911,938 A | 3/1990 | Fisher et al. | |
| 4,940,190 A | 7/1990 | Groves | |
| 5,008,254 A | 4/1991 | Weibel | |
| 5,035,904 A | 7/1991 | Huang et al. | |
| 5,049,398 A | 9/1991 | Saari et al. | |
| 5,106,644 A | 4/1992 | El-Nokaly | |
| 5,110,614 A | 5/1992 | Corbin et al. | |
| 5,164,216 A | 11/1992 | Engelbrect et al. | |
| 5,253,802 A | 10/1993 | Bernard et al. | |
| 5,260,076 A | 11/1993 | Furcsik et al. | |
| 5,266,345 A | 11/1993 | Corbin et al. | |
| 5,281,584 A | 1/1994 | Tobey | |
| 5,298,708 A | 3/1994 | Babu et al. | |
| 5,302,790 A | 4/1994 | Turpin | |
| 5,345,069 A | 9/1994 | Grindrod | |
| 5,385,640 A | 1/1995 | Weibel et al. | |
| 5,409,717 A | 4/1995 | Apicella et al. | |
| 5,416,304 A | 5/1995 | De La Cruz et al. | |
| 5,416,305 A | 5/1995 | Tambellini | |
| 5,480,669 A | 1/1996 | Zallie et al. | |
| 5,487,419 A | 1/1996 | Weibel | |
| 5,567,455 A | 10/1996 | Alsbrook, Sr. | |
| 5,584,937 A | 12/1996 | Finocchiaro | |
| 5,585,027 A | 12/1996 | Young | |
| 5,593,503 A | 1/1997 | Shi et al. | |
| 5,711,978 A | 1/1998 | Breen et al. | |
| 5,741,534 A | 4/1998 | Chung | |
| 5,766,638 A | 6/1998 | Tobey | |
| 5,916,613 A | 6/1999 | Stockley, III | |
| 5,976,598 A | 11/1999 | Akkaway et al. | |
| 6,001,399 A | 12/1999 | Kilibwa | |
| 6,013,299 A | 1/2000 | Haynes et al. | |
| 6,022,575 A | 2/2000 | Lee et al. | |
| 6,048,558 A | 4/2000 | Feldmeier et al. | |
| 6,054,698 A | 4/2000 | Mast | |
| 6,066,346 A | 5/2000 | Hunt et al. | |
| 6,068,863 A | 5/2000 | Dupart et al. | |
| 6,083,550 A | 7/2000 | Cochran et al. | |
| 6,123,975 A | 9/2000 | Ohlin et al. | |
| 6,137,099 A | 10/2000 | Hamblin | |
| 6,168,812 B1 | 1/2001 | Paulucci | |
| 6,210,723 B1 | 4/2001 | Coleman et al. | |
| 6,228,406 B1 | 5/2001 | Borzuta | |
| 6,231,898 B1 | 5/2001 | Perrine | |
| 6,251,458 B1 | 6/2001 | Weibel | |
| 6,302,321 B1 | 10/2001 | Reese et al. | |
| 6,320,172 B1 | 11/2001 | Watkins | |
| 6,352,733 B1 | 3/2002 | Haynes et al. | |
| 6,406,723 B1 | 6/2002 | Soe et al. | |
| 6,455,084 B2 | 9/2002 | Johns | |
| 6,468,355 B1 | 10/2002 | Thompson et al. | |
| 6,488,973 B1 | 12/2002 | Wright | |
| 6,503,546 B1 | 1/2003 | Ferrari-Philippe et al. | |
| 6,579,546 B1 | 6/2003 | Jahnke | |
| 6,579,549 B1 | 6/2003 | Thrasher et al. | |
| 6,579,554 B2 | 6/2003 | Moder et al. | |
| 6,589,583 B1 | 7/2003 | Hansen et al. | |
| 6,613,373 B2 | 9/2003 | Haynes et al. | |
| 6,619,503 B2 | 9/2003 | Leykin et al. | |
| 6,620,450 B1* | 9/2003 | Davis et al. | 426/549 |
| 6,623,777 B2 | 9/2003 | Kawase et al. | |
| 6,627,242 B1 | 9/2003 | McPherson et al. | |
| 6,660,311 B2 | 12/2003 | Goedeken et al. | |
| 6,664,389 B1 | 12/2003 | Shi et al. | |
| 6,706,305 B2 | 3/2004 | Wolt et al. | |
| 6,753,026 B2 | 6/2004 | Kortum | |
| 6,764,700 B2 | 7/2004 | Lamp et al. | |
| 6,803,067 B2 | 10/2004 | Braginsky et al. | |
| 6,818,873 B2 | 11/2004 | Savage et al. | |
| 6,843,167 B1 | 1/2005 | Kanafani et al. | |
| 6,858,241 B1 | 2/2005 | Kershman et al. | |
| 6,863,179 B2 | 3/2005 | Leykin et al. | |
| 6,881,429 B2 | 4/2005 | Geng et al. | |
| 6,892,513 B1 | 5/2005 | Barr et al. | |
| 6,919,097 B2 | 7/2005 | Lamp et al. | |
| 7,014,878 B2 | 3/2006 | Tangprasertchai et al. | |
| 7,531,199 B2 | 5/2009 | Haynes et al. | |
| 2002/0039612 A1 | 4/2002 | Gambino et al. | |
| 2002/0058091 A1 | 5/2002 | Kortum | |
| 2002/0064586 A1 | 5/2002 | McPherson et al. | |
| 2002/0136814 A1 | 9/2002 | Forneck et al. | |
| 2002/0146490 A1 | 10/2002 | Lamp | |
| 2002/0146497 A1 | 10/2002 | Haynes et al. | |
| 2002/0172747 A1 | 11/2002 | Brodie et al. | |
| 2002/0176914 A1 | 11/2002 | Kimball et al. | |
| 2002/0197360 A1* | 12/2002 | Lamp et al. | 426/120 |
| 2003/0017235 A1 | 1/2003 | Wright | |
| 2003/0059458 A1 | 3/2003 | Haber et al. | |
| 2003/0071036 A1 | 4/2003 | Savage | |
| 2003/0077356 A1 | 4/2003 | Campbell et al. | |
| 2003/0082287 A1 | 5/2003 | Wolt et al. | |
| 2003/0190398 A1 | 10/2003 | Reuter et al. | |
| 2003/0203076 A1 | 10/2003 | Watanabe et al. | |
| 2003/0203091 A1 | 10/2003 | Hayes-Jacobson | |
| 2003/0206994 A1 | 11/2003 | Jahnke | |
| 2004/0013781 A1* | 1/2004 | Tangprasertchai et al. | 426/549 |
| 2004/0018284 A1 | 1/2004 | Kuethe | |
| 2004/0028782 A1 | 2/2004 | Jahnke | |
| 2004/0028790 A1 | 2/2004 | Kawase et al. | |
| 2004/0047963 A1 | 3/2004 | Haynes et al. | |
| 2004/0185145 A1 | 9/2004 | Ehrman et al. | |
| 2004/0213883 A1 | 10/2004 | Sadek et al. | |
| 2004/0219271 A1 | 11/2004 | Belknap et al. | |
| 2004/0234653 A1 | 11/2004 | Cogley et al. | |
| 2004/0234663 A1 | 11/2004 | Motoi et al. | |
| 2004/0241303 A1 | 12/2004 | Levin et al. | |
| 2004/0265438 A1 | 12/2004 | Lamp et al. | |
| 2005/0031754 A1 | 2/2005 | Maningat et al. | |
| 2005/0031755 A1 | 2/2005 | Maningat et al. | |
| 2005/0031756 A1 | 2/2005 | Maningat et al. | |
| 2005/0037125 A1 | 2/2005 | Maningat et al. | |
| 2005/0048182 A1* | 3/2005 | King et al. | 426/549 |
| 2005/0129823 A1 | 6/2005 | Dohl et al. | |
| 2005/0136156 A1 | 6/2005 | Barr | |
| 2005/0175738 A1 | 8/2005 | Howard et al. | |
| 2005/0202126 A1* | 9/2005 | Zhang et al. | 426/100 |
| 2005/0226962 A1 | 10/2005 | Howard | |
| 2005/0226963 A1 | 10/2005 | Addington et al. | |
| 2005/0244551 A1 | 11/2005 | Roth | |
| 2005/0276896 A1 | 12/2005 | Sadek et al. | |
| 2005/0281921 A1 | 12/2005 | Langston | |
| 2006/0210673 A1 | 9/2006 | Petrofsky et al. | |
| 2007/0054024 A1 | 3/2007 | De Man et al. | |
| 2007/0241102 A1 | 10/2007 | Carmichael et al. | |
| 2010/0215825 A1 | 8/2010 | Boursier et al. | |

FOREIGN PATENT DOCUMENTS

| | | |
|---|---|---|
| EP | 0 727 143 A1 | 8/1996 |
| EP | 0 748 589 A1 | 12/1996 |
| EP | 0 616 779 B1 | 1/1997 |
| EP | 0776604 | 6/1997 |
| EP | 0 788 743 A1 | 8/1997 |
| EP | 0 806 145 A2 | 11/1997 |
| EP | 1 053 681 A2 | 11/2000 |
| EP | 1 053 682 A2 | 11/2000 |
| EP | 1 181 868 A2 | 2/2002 |
| EP | 1 238 588 A2 | 9/2002 |
| EP | 1291298 | 3/2003 |
| EP | 1 433 383 A1 | 6/2004 |
| GB | 961398 A | 6/1964 |
| GB | 1062423 A | 3/1967 |
| GB | 1089627 | 11/1967 |
| GB | 1 242 350 A | 8/1971 |
| GB | 1264529 A | 2/1972 |
| JP | 7111855 A | 5/1995 |
| JP | 7289144 A | 11/1995 |
| JP | 7289145 A | 11/1995 |
| JP | 8173013 A | 7/1996 |

| | | |
|---|---|---|
| JP | 9295682 | 11/1997 |
| JP | 11009173 A | 1/1999 |
| JP | 11139465 | 5/1999 |
| JP | 2000062857 | 2/2000 |
| JP | 2004083079 | 3/2004 |
| WO | 87/00506 A1 | 1/1987 |
| WO | 90/15147 A1 | 12/1990 |
| WO | 93/03979 A1 | 3/1993 |
| WO | 95/07025 A1 | 3/1995 |
| WO | 96/11577 A1 | 4/1996 |
| WO | 97/35889 A1 | 10/1997 |
| WO | 99/15021 A1 | 4/1999 |
| WO | 99/37158 A1 | 7/1999 |
| WO | 99/44428 A1 | 9/1999 |
| WO | 03/067992 A1 | 8/2003 |
| WO | 03/079798 A1 | 10/2003 |
| WO | 03/092388 A1 | 11/2003 |
| WO | 03/093137 A1 | 11/2003 |
| WO | 2004/066955 A2 | 8/2004 |
| WO | 2004/113096 A2 | 12/2004 |
| WO | 2005023007 A1 | 3/2005 |
| WO | 2006/001812 A1 | 1/2006 |

OTHER PUBLICATIONS

C. Ortolá et al., "Almacenamiento del pan envasado. I. Efectos de la reducción de la actividad de agua y control de la contaminación microbiana sobre las caracteristicas del pan" Rev. Agroquím. Tecnol. Aliment., vol. 23, No. 3 (1989), pp. 384-398.
PRNewswire, "Graphic Packaging International Launches Latest Microwave Technology to Meet Consumer 'Grab n Go' Convenience Requirements." Oct. 11, 2004.
Curwood. "Curwood Increases Consumer Benefits with Its EZ Peel Reseal Package Desired for Land O'Frost.", Feb. 9, 2005, Curwood Marketing.
William E. Brown. "Plastics in Food Packaging." Marcel Kekker, Inc, 1992, p. 39.
Robert S. Igoe. "Dictionary of Food Ingredients." 4th Edition, Aspen Publishers, 2001, pp. 83, 90, 156.
Office Action dated Dec. 30, 2008 for U.S. Appl. No. 11/531,601.
Office Action dated Jul. 22, 2009 for U.S. Appl. No. 11/531,601.
Office Action dated Sep. 17, 2009 for U.S. Appl. No. 11/531,585.
Office Action dated Oct. 28, 2009 for U.S. Appl. No. 11/531,592.
Extended European Search Report, European Patent Application No. 09173830.2, date of completion Dec. 15, 2009, 6 pages.
European Search Report, European Patent Application No. 09173844.3, date of completion Feb. 23, 2010, 4 pages.
Search Report for European Patent Application No. 07116276.2.
Search Report for European Patent Application No. 07114718.5.
Search Report for European Patent Application No. 07116274.7.
Bradley, G., "Resistant Starch and its Use as a Functional Fibre in Food Systems," Foodline: Science Sight, AN 373399, Abstract, 1 page, abstract of paper publication by Maarsen: Process Press Europe, 1997 (231-233).
Eerlingen, R.C., "Enzyme-resistant starch. III. The Quality of Straight-Dough Bread Containing Varying Levels of Enzyme-Resistant Starch." Multifilesegment: Food Science and Technology Abstracts, AN 1994-07-Mz0077, Abstract, 1 pages, abstract of journal article publication in Cereal Chemistry, 1994; 71, (2): 165-170.
Pre-Filing Search Containing Patent and Non-Patent Literature related documents, undated (22 pages).
Australian Examination Report, Singapore Patent Application No. SG 200706519-6, date of mailing of the report Apr. 14, 2009, 6 pages.
Philippine Search Report, Philippine Patent Application No. 1-2007-000355, date released Jun. 22, 2009, 2 pages.
K.D. Nishita et al., "Development Of A Yeast-Leavened Rice-Bread Formula." Cereal Chemistry, vol. 53, No. 5, 1976, pp. 626-635.
R. Sharadanant et al., "Effect of Hydrophilic Gums on Frozen Dough. I. Dough Quality." Cereal Chemistry, vol. 80, No. 6, 2003, pp. 764-772.

* cited by examiner

MICROWAVABLE FOOD PRODUCTS

Packaging systems and packaging methods for storage and heating of food products are disclosed, and in particular packaging systems and packaging methods where two different food products are adapted to be simultaneously heated using a microwave oven. Also provided are microwavable food products utilizing such packaging systems and packaging methods.

BACKGROUND

Heretofore, considerable effort has been expended to provide food products such as frozen or refrigerated pizzas and sandwiches for preparation by a consumer, utilizing conventional gas or electric heated ovens. More recently, with the increasing popularity of microwave ovens, attention has turned to providing consumers with kits and components for preparing dough-containing products such as frozen or refrigerated pizzas and sandwiches.

Often food products that are to be heated in a microwave oven are in a frozen state prior to heating. On the one hand, providing the food products in a frozen state can extend the shelf life of the food products. For instance, a conventional farinaceous or bread-based food product stored at room temperature may have a shelf life of about seven days or less. Such a short shelf life disadvantageously limits the distribution of such food products. Providing refrigerated storage can increase the shelf life, but often results in stale product. On the other hand, providing the food products in a frozen state can disadvantageously result in inadequate moisture control during heating in a microwave oven. For instance, when two different food products are simultaneously heated in a microwave oven from a frozen state, the food products may heat at different rates. When one of the food products is a farinaceous or bread-based food product, that food product may heat from the frozen state comparatively faster than the other food product. The result can be an overheated farinaceous or bread-based food product that is dry and hard compared to its fresh state. Another disadvantage of providing frozen food products is that the time required to heat the food products can in some instances be longer than from a refrigerated state.

Moreover, and as has been detailed in U.S. Pat. No. 5,416,304, microwave ovens exhibit their own unique challenges when preparing food products. For example, microwave ovens may exhibit substantial temperature gradients or non-uniform heating. In addition, frozen bread-based food products can exhibit a nonuniform temperature response to microwave radiation throughout their volume, during a typical heating cycle. As a result, portions of the food item melt or thaw before other portions and this results in localized accelerated heating due to the preferential absorption of microwave energy by liquids being irradiated. As a result of these and other conditions, further improvements in the preparation and packaging of dough-containing food products are being sought.

SUMMARY

A packaging system for food products is disclosed comprising a first food product surround by a sealed inner wrapper, a second food product, a tray, and a sealed outer wrapper enclosing the first and second food products and the tray. The first food product may have a first moisture content and the second food product may have a second moisture content, with the first and second moisture contents being different. The food products may be suitable for an extended refrigerated shelf life in order to provide for reduced heating times and improved heating times. Generally, the food products of this invention have a refrigerated shelf life of at least about 75 days. The food products may also be suitable for reheating from a frozen state with improved moisture control.

The first food product may be surrounded by a sealed inner film wrapper having an opening feature to facilitate opening and removal of the sealed inner film wrapper prior to microwave cooking. The first food product, surrounded by the sealed inner wrapper, is adjacent to the second food product and the sealed inner wrapper will restrict moisture migration between the first food product and the second food product prior to microwave heating. A tray is provided for supporting the second food product. The second food product spaces the first food product, surrounded by the sealed inner wrapper, from the tray. A sealed outer film wrapper surrounds the first food product, the second food product and the tray. The sealed outer film wrapper may have an opening feature to facilitate opening and removal of a sealed outer film wrapper prior to microwave cooking.

In one aspect, the tray may have a shield disposed thereon to at least partially shield portions of the second food product from direct microwave radiation during heating in a microwave oven. The shield may be a susceptor, and may be in direct contact with portions of the second food product. Vents may be provided adjacent the second food product for venting moisture during heating in a microwave oven. The vents may be apertures formed in the tray, or may be formed in an expanding susceptor upon microwave heating.

In another aspect, the tray may have a bottom panel, a pair of upstanding side panels each connected via a fold to opposing sides of the bottom panel and an end panel connected to and extending between opposing sides of the pair of upstanding side panels and a side of the bottom panel. The shield may be disposed on at least a portion of each of the bottom panel and the pair of side panels of the tray. The tray can be formed of a material selected to absorb moisture from a second food product prior to opening of the sealed outer film wrapper.

In another aspect, the sealed outer film wrapper has a base portion and a cover portion. The base portion of the sealed outer film wrapper has a height greater than a height of each of the pair of upstanding side panels such that the tray can be accommodated in the base portion of the outer film wrapper. The base portion of the outer film wrapper also has a peripheral flange. The lid portion of the outer film wrapper is generally planar and is attached to the peripheral flange of the base portion with a peelable seal. The sealed inner film wrapper has a pair of opposing panels joined via a peelable seal surrounding the first food product. A gas selected to preserve shelf life of the second food product may be contained within the sealed outer film wrapper prior to opening.

A method of packaging food products suitable for microwave cooking is disclosed. The method includes sealing a first food product having a high moisture content in an inner film wrapper surrounding the first food product. The sealed inner film wrapper may have an opening feature permitting opening of the sealed inner wrapper prior to microwave cooking. The method may also include placing the first food product, surrounded by the inner film wrapper, adjacent to a second food product having a low moisture content. The inner wrapper may restrict moisture migration from a first food product to the second food product prior to microwave heating. The method may also include placing a tray adjacent to the second food product. The tray may have a shield, such as a susceptor, disposed thereon that is in contact with at least one surface of the second food product. The second food product may space the first food product from the tray. The method may also include sealing the first food product, surrounded by the inner film wrapper, the second food product and the tray in an outer film wrapper. The outer film wrapper may have an opening feature permitting opening of the sealed outer film wrapper prior to microwave cooking to permit access to the first food product, second food product and tray.

In one aspect, the method may include the steps of either gas or vacuum flushing the contents of the outer film wrapper prior to sealing of the outer film wrapper and either gas or vacuum flushing the contents of the inner film wrapper prior to sealing of the inner film wrapper.

In another aspect, the method may include the step of thermoforming a base portion of the outer film wrapper. The base portion may have a generally rectangular bottom wall and an upstanding sidewall attached to the periphery of the bottom wall. An outwardly extending flange may be attached to the upstanding sidewall on an end opposite thereof from the bottom wall. The method may include sealing a generally planar cover portion of the outer film wrapper to the flange of the base portion to seal the outer film wrapper, with the first food product, the second food product and the tray therein. The method may include thermoforming a base portion of the inner film wrapper. The base portion may have a pocket sized to contain the first food product as well as an outwardly extending flange. The method may further include sealing a generally planar cover portion of the inner film wrapper to the flange of the base portion to seal the inner film wrapper with the first food product therein. The opening feature of at least one of the inner film wrapper and the outer film wrapper may include a peelable seal between the base and the cover portions.

The method may include the step of folding a paperboard blank to form a bottom panel and a pair of side panels each attached to an edge of the bottom panel. The side panels may each be generally perpendicular to the bottom panel. The method may also include folding an end panel of the paperboard blank relative to the bottom panel and into a generally perpendicular arrangement with the bottom panel. The method may also include attaching a pair of tabs of one of the end panel and the pair of side panels to the other of the end panel and the pair of side panels to connect the end panel relative to the pair of side panels.

A method of using the food packaging systems described herein and provided, including the steps of opening the outer film wrapper to gain access to the first food product, surrounded by the sealed inner wrapper and the second food product. The method of use may also include removing the first food product, surrounded by the sealed inner wrapper, from being adjacent with the second food product. The method may further include opening and removing the inner film wrapper to gain access to the first food product. The method may also include placing the first food product in contact with the second food product prior to microwave heating.

The present invention is related to U.S. patent application Ser. No. 11/531,592 entitled "PACKAGING SYSTEM FOR STORAGE AND MICROWAVE HEATING OF FOOD PRODUCTS"; U.S. patent application Ser. No. 11/531,585 entitled "PACKAGING METHOD FOR STORAGE AND MICROWAVE HEATING OF FOOD PRODUCTS"; and U.S. patent application Ser. No. 11/531,601 entitled "BAKED MICROWAVABLE FROZEN BREAD AND BAKERY PRODUCTS," all of which were filed on the same date as this present specification, all of which are owned by the same assignee, and all of which are hereby incorporated by reference in their entireties.

DETAILED DESCRIPTION OF THE DRAWINGS

Figure 1:
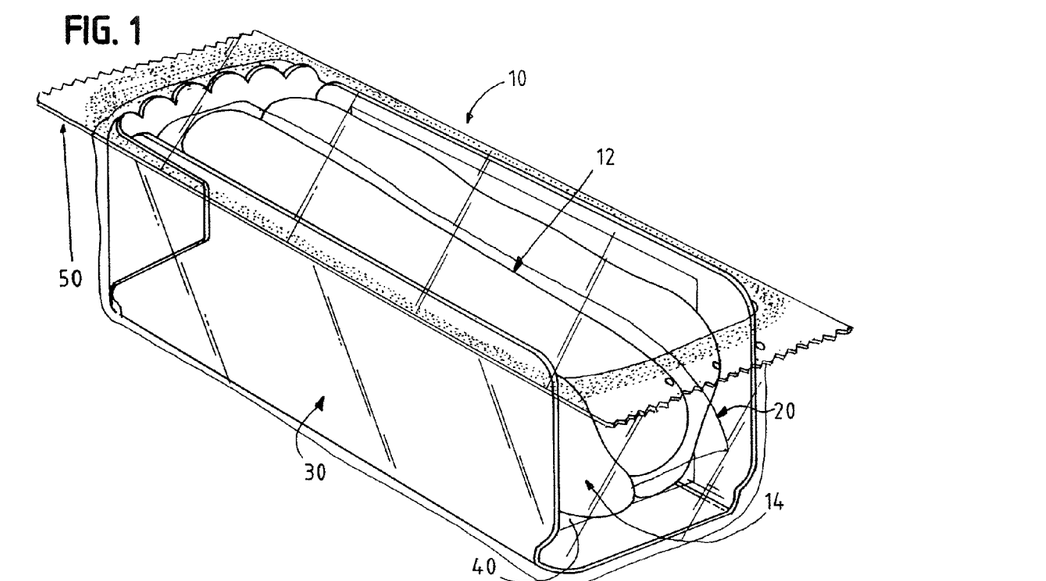
FIG. 1 is a perspective view of a packaging system for storage and microwave heating of food products, including a first food product, an inner wrapper, a second food product, a tray and an outer wrapper.

The packaging system 10 includes a first food product 12 sealed within an inner wrapper 20, a second food product 14 positioned within a tray 30 and spacing the first food product 12 from the tray 30, and an outer wrapper 50 sealing the first food product 12, sealed within the inner wrapper 20, the second food product 14 and the tray 30 therein, as illustrated in FIG. 1. The inner wrapper 20 restricts moisture migration between the first and second food products 12 and 14 prior to removal of the inner wrapper 20. A shield, such as in the form of a susceptor 40, is disposed on the tray 30 and is in contact with more than one surface of the second food product 14. The first and second food products 12 and 14 may be suitable to be stored in either a refrigerated state or a frozen state with improved moisture control to result in heated food products with improved visual and tactile properties.

In order to use the packaging system 10 for simultaneous microwave heating of the first and second food products 12 and 14, the outer wrapper 50 is first opened and removed to permit access to the first and second food products 12 and 14. The first food product 12, sealed within the inner wrapper 20, is removed from adjacent the second food product 14 and the inner wrapper 20 is opened and removed. The first food product 12, no longer sealed within the inner wrapper 20, is replaced adjacent the second food product 14. The first food product 12 and second food product 14, contained within the tray 30, are then ready for simultaneous microwave heating after both the inner and outer wrappers 20 and 50 have been removed.

Figure 2:
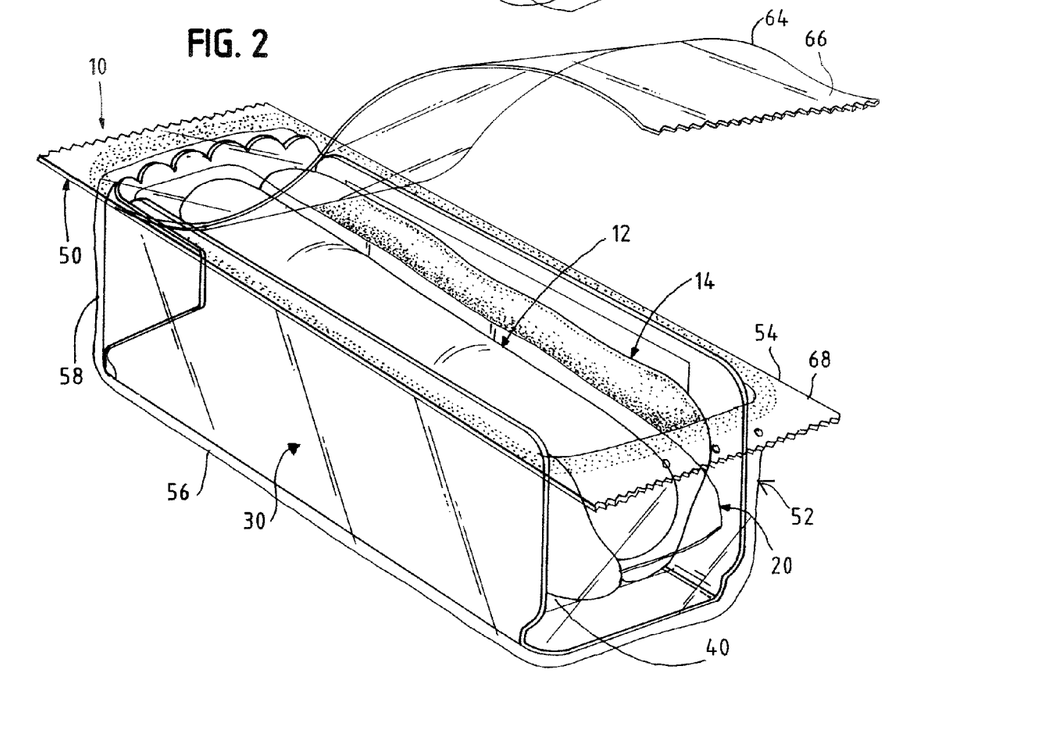
FIG. 2 is a perspective view of the packaging system of FIG. 1 with a portion of the outer wrapper removed.
Figure 3:
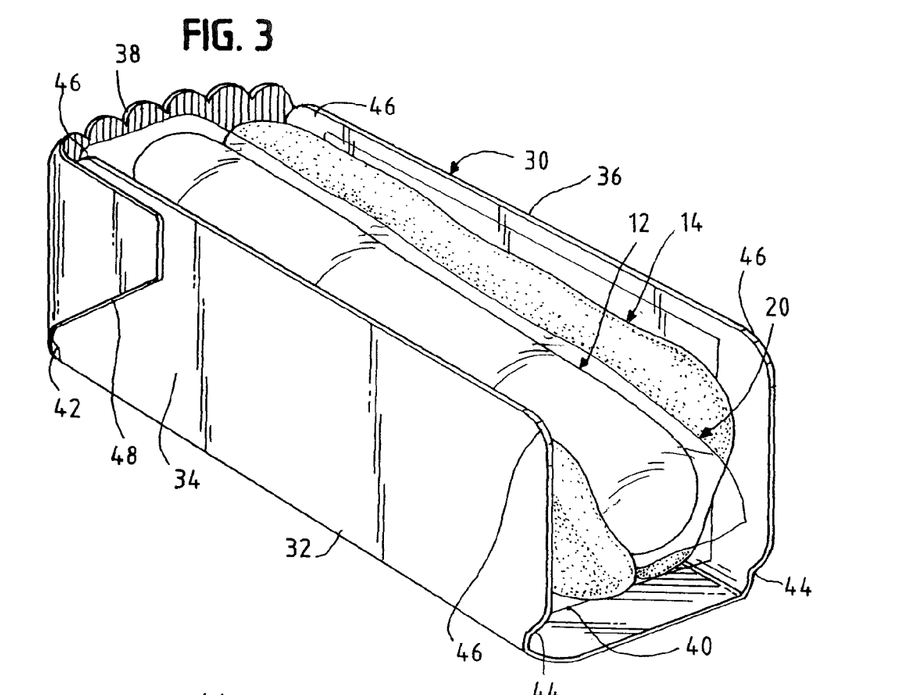
FIG. 3 is a perspective view of the packaging system of FIG. 1 with a portion of the outer wrapper removed and the inner wrapper removed.
Figure 4:
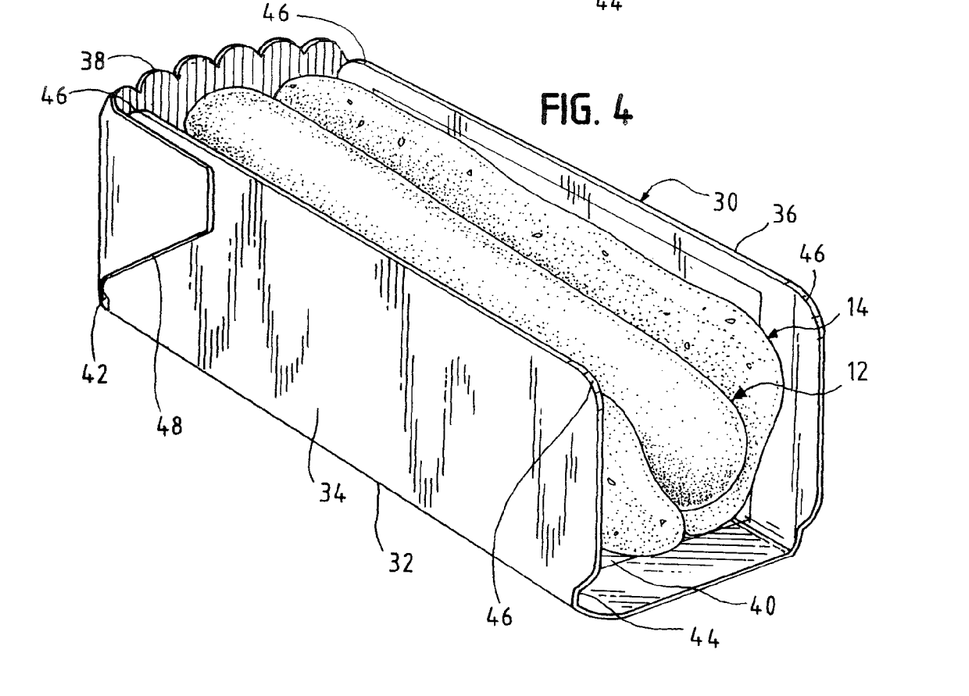
FIG. 4 is a perspective view of the packaging system of FIG. 1 with the outer wrapper removed and the inner wrapper removed.

The tray 30 is open-ended, having a bottom wall 32 and three upstanding walls 34, 36 and 38, as illustrated in FIGS. 3 and 4. More specifically, the tray 30 has a generally rectangular bottom wall 32 and a pair of opposing, generally rectangular and upstanding sidewalls 34 and 36 attached to opposing edges of the bottom wall 32, as illustrated in FIGS. 5a-5d. An upstanding end wall is attached to an edge of the bottom wall 32, different from the edges having the sidewalls 34 and 36 attached, as well as to each of the sidewalls 34 and 36. As illustrated in FIGS. 1-5, the generally rectangular bottom wall 32 may have a length that is greater than its width. The sidewalls 34 and 36 are attached to opposing longitudinal side edges of the bottom wall 32 and the end wall 38 is attached to one of the transverse edges of the bottom wall 32. Scallops or other designs may be formed for decorative purposes on an edge of the end wall 38 opposite the edge attached to the bottom wall 32. A tab 48 is provided at opposing edges of the end wall 38, different from the edges having the scallops and attached to the bottom wall 32. Each of the tabs 48 is adhesively attached to the adjacent sidewall 34 and 36 to secure the end wall 38 and sidewalls 34 and 36 in their upstanding orientations relative to the bottom wall 32. The end wall 38 and sidewalls 34 and 36 may be generally perpendicularly orientated relative to the bottom wall 32, or may be outwardly flared.

Each of the four corners of the generally rectangular sidewalls 34 and 36 may be rounded so that the potential for the corners to pierce the outer wrapper 50, such as during manufacturing, shipping, stocking and handling, is reduced. Corners of the end wall 38 and the bottom wall 32 may also be rounded to reduce the potential for the corners to pierce the outer wrapper 50. For example, the upper corners 46 of each of the sidewalls 34 and 36 may be rounded, as illustrated in FIGS. 3 and 4. At each of the two intersections of corners of the end wall 38, bottom wall 32, and the sidewalls 34 and 36, a rounded cut-out 42 is formed that eliminates the generally right-angled corners of each of the end wall 38, bottom wall 32 and sidewalls 34 and 36 to reduce the potential for the corners to inadvertently pierce the outer wrapper 50. Similarly, at each of the two intersections of corners of the bottom wall 32 and the sidewalls 34 and 36 a rounded cut-out 44 is formed that eliminates the generally right-angled corners of each of the bottom wall 32 and sidewalls 34 and 36 to reduce the potential for the corners to inadvertently pierce the outer wrapper 50.

The tray 30 may be formed from a single, unitary paperboard blank (not shown) into its erected configuration. The blank may have the cut-outs 42 and 44 and rounded corners 46 cut therein. The blank may be folded about a plurality of fold lines or scores to orientate the bottom wall 32, sidewalls 34 and 36, end wall 38 and tabs 48. More specifically, the sidewalls 34 and 36 may be folded about fold lines between them and the longitudinal edges of the bottom wall 32, the end wall 38 may be folded about a fold line between it and the longitudinal edges of the bottom wall 32, and the tabs 48 may each be folded about fold lines between them and the end wall 38 into position adjacent the sidewalls 34 and 36 and attached thereto, such as using adhesive. Alternatively, tabs can be provided on the sidewalls 34 and 36 for adhesive attachment to the end wall 38. In one example, the tray 30 may comprise a solid bleached sulfate paperboard having a thickness of about 0.018 inches.

A shield, such as in the form of a susceptor 40, is preferably, though not necessarily, provided on at least part of the inner surfaces of the tray 30 for contacting outer surfaces of the second food product 14 when the second food product 14 is placed in the tray 30. Preferably, though not necessarily, the susceptor 40 is provided on portions of the interior surfaces of each of the upstanding sidewalls 34 and 36 and bottom wall 32 of the tray 30 so that more than one surface of the second food product 14 is in contact with the susceptor 40 during microwave heating. The susceptor 40 is believed to shield microwaves from directly contacting portions of the adjacent second food product 14. This can advantageously reduce the amount of microwave energy absorbed by the second food product 14 during heating to reduce drying and overheating of the second food product 14. In addition, the susceptor 40 may, through conductive heating, form a moisture resistant barrier layer in the adjacent portions of the second food product 14 which may advantageously reduce the moisture that can be dissipated from the second food product 14 during microwave heating.

Various types and forms of susceptors 40 can be provided for use with the food packaging system 10. For example, the susceptor 40 may be a film having a layer of metal deposited thereon that is adhesively attached to the tray 30, such as by adhesively attaching the susceptor 40 to the blank prior to folding the blank into the tray 30. Alternatively, the susceptor 40 may be printed upon the blank, thereby eliminating the need for separate attachment of the susceptor 40. In addition, the susceptor 40 may have different thicknesses to assist in concentrating heat energy at select portions of the food product 14. By graduating the amount of susceptor material or coating, overheating of select portions of the food product 14 can be avoided during cooking. Virtually any pattern of susceptor 40 can be employed. For example, the susceptor 40 can be coated or printed as a series of spaced-apart diagonal stripes or can comprise an array of dots or other shapes.

The susceptor 40 is preferably, though not necessarily, of a type that expands upon heating to better conform to the adjacent portion of a food product, which can be advantageous if the adjacent portion of the food product has surface irregularities or is slightly curved, and thus not entirely planar. To accommodate these irregularities and promote more contact with the adjacent portion of a food product, the susceptor 40 may expand upon heating. One type of expanding susceptor material is made and sold by Graphics Packaging, Inc., Marietta, Ga., under the product name QuiltWave™. In particular, the susceptor 40 may be a 48 gauge QuiltWave™ susceptor. As the susceptor 40 expands, it can at least partially contact some of the non-planar portions of the adjacent portion of a food product. In addition, the expanded susceptor 40 can have multiple channels or groves formed therein that permit venting of moisture away from the surfaces of the second food product 14 adjacent thereto. Such venting can advantageously reduce the potential for moisture accumulation on those surfaces of the second food product 14 adjacent the susceptor 40. When the second food product 14 is farinaceous, such as a hot dog bun, a less soggy bun can result from microwave heating due to improved moisture venting achieved using an expanding susceptor 40. Other venting mechanisms may be used instead or in addition. For example, a corrugated susceptor material may also function to vent moisture during microwave heating.

Although susceptors 40 that are in contact with the second food product 14 are described herein, shields, whether in contact or not in contact with the second food product 14, may be used instead or in addition to the susceptor 40. For instance, one or more of the outwardly facing surfaces of the tray 30 may have a shield thereon.

The first food product 12 may have a high moisture content, and the second food product 14 may have a low moisture content. The terms high moisture content and low moisture content are used herein in a relative sense. That is, the term high moisture content means a higher moisture content as compared to the term low moisture content, and vice versa. The first food product 12 may be proteinaceous and the second food product 14 may be farinaceous. For example, the first food product 12 may be a meat-based food product, such as a hot dog, including a meat hot dog, a beef hot dog, a cheese hot dog and a light hot dog. The second food product 14 may be a bread-based food product, such as a hot dog bun. Other examples of first and second food product combinations include a sliced deli meat and sandwich bread, an egg product and a slice of breakfast bread or bagel, and a milk product and a cereal product.

Figure 5:
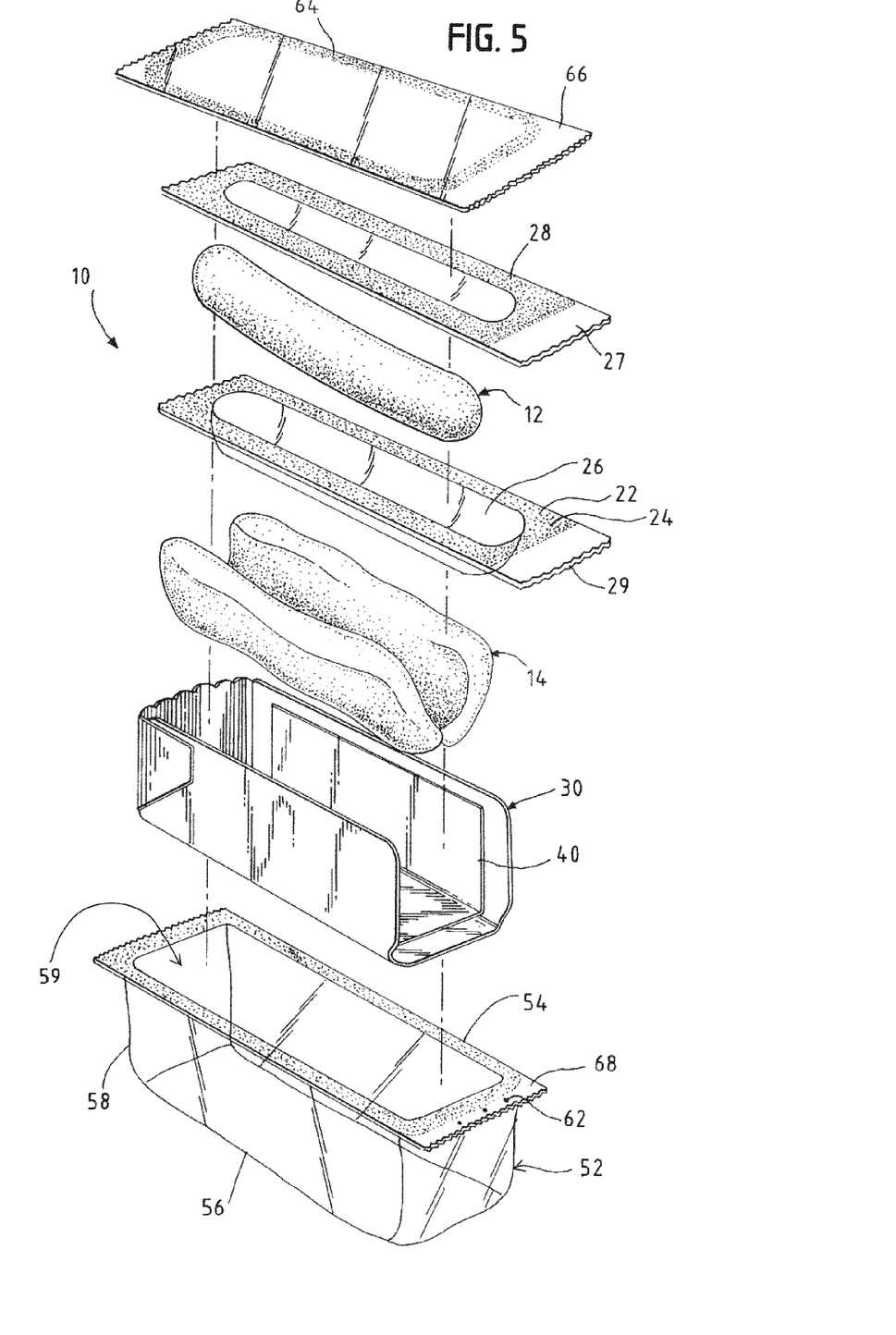
FIG. 5 is an exploded perspective view of the package system of FIG. 1.
Figure 5A:
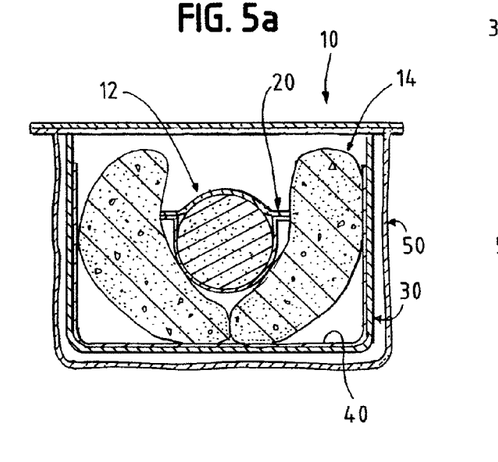
FIG. 5a is a sectional view of the packaging system of FIG. 1 taken transverse to the longitudinal axis thereof.
Figure 5B:
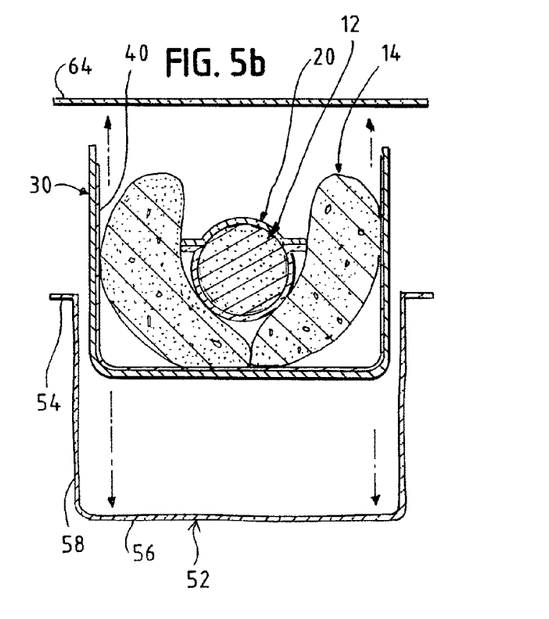
FIG. 5b is a sectional view of the packaging system of FIG. 1 showing the outer wrapper being removed.
Figure 5C:
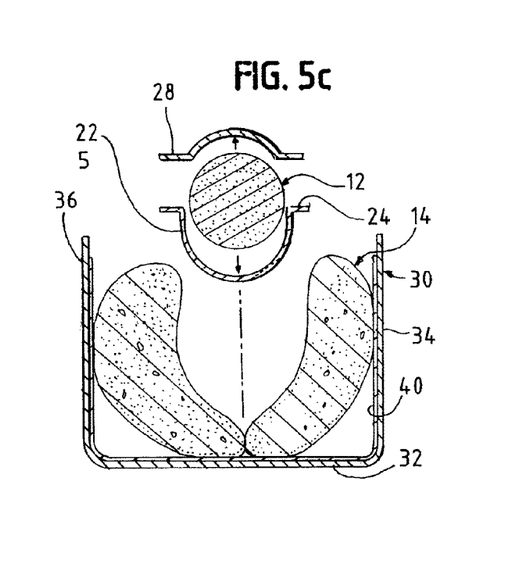
FIG. 5c is a sectional view of the packaging system of FIG. 1 showing the inner wrapper being removed.
Figure 5D:
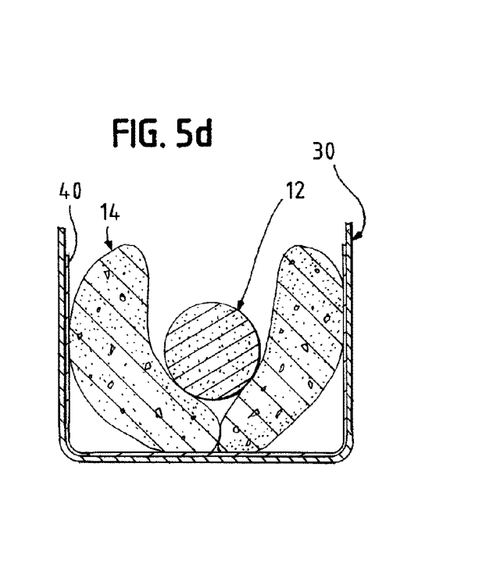
FIG. 5d is a sectional view of the packaging system of FIG. 1 showing both the inner and outer wrappers removed and the first food product placed adjacent to the second food product in the tray.

The inner wrapper 20 has a base 22 and a cover 28. The base 22 has a compartment 26 formed therein that generally corresponds to the size of the first food product 12. The compartment 26 has a closed bottom end and an open top end. The base 22 of the inner wrapper 20 has a peripheral flange 24 extending outwardly from the open end of the compartment 26, as illustrated in FIG. 5. Once the first food product 12 has been placed in the compartment 26 of the base 22 of the inner wrapper 20, the cover 28 is sealed to the peripheral flange 24 of the base 22 so that the first food product 12 is completely surrounded by the inner wrapper 20.

The inner wrapper 20 may include an opening feature for facilitating opening of the inner wrapper 20 to gain access to the first food product 12. The opening feature may include a peelable seal that is formed between the cover 28 and the base 22 of the inner wrapper 20, such as between the periphery flange 24 of the base 22 and the cover 28 of the inner wrapper 20. In one example, the peelable seal may have a peel strength, i.e., the force required for separation, of about 2.5 pounds/inch. The peelable seal may be formed upon heat activation of an adhesive layer of one of the facing sides of the base 22 and cover 28 of the inner wrapper 20. The opening feature may include a gripping flange 27 disposed on the cover 28 and an opposing gripping flange 29 disposed on the base 22 of the inner wrapper 20. The gripping flanges 27 and 29 are preferably not sealed to each other and can be pulled in opposing directions to facilitate separation of the seal, whether peelable or otherwise, between the cover 28 and base 22 of the inner wrapper 20 and thus to gain access to the first food product 12 disposed in the compartment 26 of the base 22. The opening feature may include serrations between one or more of the adjacent edges of the cover 28 and base 22 to reduce tacking of the adjacent edges during manufacturing, and thus to facilitate ready separation of the cover 28 from the base 22. For instance, the serrations may be provided on adjacent edges of the gripping flanges 27 and 29 spaced from the seal therebetween to facilitate separation and thus gripping of the gripping flanges 27 and 29. Graphics may be printed on the inner and outer film wrappers 20 and 50 to indicate a preferential location for initiating their opening. For example, one or more arrows or other indicia may indicate that opening can be initiated via the flanges 66 and 68 of the outer wrapper 50 and/or via the flanges 27 and 29 of the inner wrapper 20.

The outer wrapper 50 also has a base 52 and a cover 64. The base 52 has a compartment 59 formed therein that generally corresponds to the size of the erected tray 30, including having a depth that is about the same or greater than the height of each of the pair of sidewalls 34 and 36 of the tray 30. The compartment 59 has a bottom panel 56 and an upstanding sidewall panel 58 connected to the periphery of bottom panel 56. The base 52 of the outer wrapper 50 has a peripheral flange 54 extending outwardly from an end of the sidewall panel 58 opposite the bottom panel 56, as illustrated in FIGS. 1, 2 and 5. Once the tray 30, containing the first food product 12, surrounded by the inner wrapper 20, and the second food product 14, has been placed in the compartment 59 of the base 52 of the outer wrapper 50, the cover 64 is sealed to the peripheral flange 54 of the base 52 so that the tray 30 and its contents are completely surrounded by the outer wrapper 50.

Similar to the inner wrapper 20, the outer wrapper 50 may include an opening feature for facilitating opening of the outer wrapper 50 to gain access to the first food product. The opening feature may include a peelable seal that is formed between the cover 64 and the base 52 of the outer wrapper 50, such as between the periphery flange 54 of the base 52 and the cover 64 of the outer wrapper 50. In one example, the peelable seal may have a peel strength of about 2.3 pounds/inch. The peelable seal may be formed upon heat activation of an adhesive layer of one of the facing sides of the base 52 and cover 64 of the outer wrapper 50. The opening feature may include a gripping flange 66 disposed on the cover 64 and an opposing gripping flange 68 disposed on the base 52 of the outer wrapper 50. The gripping flanges 66 and 68 are preferably not sealed to each other and can be pulled in opposing directions to facilitate separation of the seal, whether peelable or otherwise, between the cover 64 and base 52 of the outer wrapper 50 to gain access to the tray 30 and its contents in the compartment 59 of the base 52. The opening feature may include serrations between one or more of the adjacent edges of the cover 64 and base 52 to reduce tacking of the adjacent edges during manufacturing, and thus to facilitate ready separation of the cover 64 from the base 52. The serrations may be provided on adjacent edges of the gripping flanges 66 and 68 spaced from the seal therebetween to facilitate separation and thus gripping of the gripping flanges 66 and 68. The opening feature may include one or more raised protuberances 62 disposed on one or both of the flanges 66 and 68. The raised protuberances 62 are dimensioned to provide a localized separation between the flanges 66 and 68 to facilitate separation of the flanges 66 and 68, such as by reducing the effects of tacking between adjacent edges of the flanges, and thus opening of the outer wrapper 50. The protuberances 62 are preferably spaced from the sealing area such that they do not interfere with the seal between the periphery flange 54 of the base 52 and the cover 64 of the outer wrapper 50.

In one example, the hot dog bun may have a length of about 5.5 inches, a height of about 1.75 inches and a width of about 1.5 inches; and the hot dog may have a length of about 5 inches and a diameter of about 1 inch. The bottom wall 32 of the tray 30 may have a length of about 5.2 inches and a width of about 1.9 inches. The heights of the sidewalls 34 and 36 may each be about 1.5 inches. The compartment 59 of the base 52 of the outer film wrapper 50 may have similar or slightly larger dimensions as compared to those of the tray 30. The periphery flange 54 of the base 52 has a width sufficient to accommodate a sealing area of about 0.25 inches, and the gripping flange 68 extends about 0.4 inches beyond the adjacent sealing area of the periphery flange 54. The cover 64 is sized to cover the compartment 59 of the base 52 and seal to the periphery flange 54 of the base 52, as well as to include a gripping flange 66 about the same size as the gripping flange 68 of the base 52. The inner wrapper 20 may have a length of about 6.2 inches and a width of about 1.5 inches, including a sealing area having a width of about 0.25 inches and flanges 27 and 29 extending about 0.4 inches beyond the sealing area. Although specific dimensions of the food packaging system 10 are described herein, the dimensions can be modified, for instance, to accommodate differently-sized food products 12 and 14.

The individual food packaging systems 10, including the first food 12 product surrounded by the inner wrapper 20, the second food product 14, the tray 30 having the susceptor 40, and the outer wrapper, may be provided for individual availability, such as in a refrigerator of a convenience store for point-of-sale use. Alternatively, multiple individual food packaging systems 10 may be packaged together in a carton, such as two, three, four or more per carton. Such packaging of multiple food packaging systems 10 together can be suitable for distribution via a grocery store where a consumer can purchase multiple food packaging systems and store them in a refrigerator or freezer until consumption is desired.

In one example of using the packaging system 10 for microwave heating of the first and second food products 12 and 14, the cover 64 of the outer film wrapper 50 is first removed from the base 52 of the outer film wrapper 50. This can be facilitated, for example, by pulling the gripping flange 66 of the cover 64 and the gripping flange 68 of the base 52 in opposite directions to break the seal between the periphery flange 54 of the base 52 and the cover 64. Once the cover 64 of the outer film wrapper 50 has been removed from the base 52 of the outer film wrapper 50, the tray 30, containing the first food product 12 surrounded by the inner film wrapper and the second food product 14, can be removed from the base 52 of the outer wrapper 50 and the base 52 and cover 64 of the outer wrapper 50 can be discarded. After the cover 64 has been removed from the outer wrapper, the first food product 12, surrounded by the inner wrapper 20, can be removed from being adjacent to the second food product 14 so that the inner wrapper 20 can be removed from about the first food product 12. The removal of the inner wrapper 20 can be facilitated, for example, by pulling the gripping flange 27 of the cover 28 and the gripping flange 29 of the base 22 in opposing directions to break the seal between the periphery flange 24 of the base 22 and the cover 28. Once the cover 28 of the inner wrapper 20 has been removed, the first food product 12 can be removed from the compartment 26 of the base 22 and the base 22 and cover 28 of the inner wrapper 20 can be discarded. Following removal of the first food product 12 from the inner wrapper 20 and removal of the tray 30 and second food product 14 from the outer wrapper, the first food product 12 can be placed adjacent to the second food product 14 which in turn either is already adjacent to the tray 30 or can be placed adjacent to the tray 30. The combined tray 30, second food product 14 and first food product 12 can then be heated in a microwave oven once both the inner wrapper 20 and outer wrapper 50 have been removed. The use of the food packaging system 10 is not limited to these particular steps in this particular sequence. For instance, the base 52 of the outer wrapper 50 may be removed immediately prior to placing the combined tray 30, second food product 14 and the adjacent first food product 12 in a microwave oven for heating.

By way of example, when first food product comprises a hot dog and the second food product comprises a hot dog bun, the combined tray 30, second food product 14 and first food product 12 can be heated in a microwave oven using the high power setting of the microwave oven for a period of between 20 and 45 seconds so that the first food product 12 reaches a temperature of about 160° F. Preferably, the first and second food products 12 and 14 are left in the microwave for about 30 seconds after heating to permit excess moisture to vent.

During microwave heating, the susceptor 40 positioned on the tray 30 assists in regulating the moisture of the first and second food products so that the first and second food products 12 and 14 are neither too soggy, i.e., too much moisture, or too dry, i.e., too little moisture. The moisture regulation provided by the susceptor 40 is believed to be caused by one or more factors. One of the factors pertaining to moisture regulation is that during microwave heating the susceptor 40, if of the expanding type, can expand and form channels that permit venting of moisture. Another factor is that when the tray 30 is formed of paperboard capable of absorbing moisture prior to microwave heating, such as during refrigerated or frozen storage, such moisture can be restricted from entering the second food product via the surfaces immediately adjacent to the susceptor 40 by the susceptor 40 or by the susceptor 40 heating such surfaces such that they are less inclined to absorb moisture. Another factor is that moisture may not condense on the susceptor 40 due to the higher temperature of the susceptor 40 during microwave heating, in particular as compared to the lower temperature of the paperboard tray 30, and thus may not be absorbed by the adjacent surfaces of the second food product 14, such as during cooling following microwave heating.

In one example, the second food product 14 may comprise a bread-based product having a specific dough formulation that has been found to advantageously have an extended shelf life under refrigeration or freezing and properties which result in the product becoming neither too soggy nor too dry during heating in a microwave oven when used in conjunction with the packaging system 10 disclosed herein. The dough formulations in the present specification are generally expressed in baker's percentages, which are weight percentages based on the weight of flour used in a specific recipe (generally per 100 pounds of flour). For example, for 100 pounds of flour in a recipe, 57 percent water and 1.5 percent salt would mean the addition of 57 pounds of water and 1.5 pounds of salt, respectively, to 100 pounds of flour. Of course, such baker's percentages do not normally add up to 100 percent. Conventional percentages can be calculated from bakers percentages by normalizing to 100 percent.

Baking science involves a complicated process employing time, temperature and relative humidity to produce various bread products. The time, temperature and relative humidity parameters are generally different for bread, rolls, pizza crusts, pastry and cereal products, not only with regard to their appearance (crust color, size, etc.), but also with regard to the development, texture, and size. Some of the desirable changes caused by baking are protein denaturing, starch gelatinization, moisture migration and veracity (cell development or grain). Many factors may be involved in preparing a baked product which is appealing in the eyes of the ultimate consumer. A manufacturer must also consider items such as shelf life and how a consumer will actually use a product. Consequently, it is desirable to have some quantitative measure by which one can determine whether a production line product meets specification. One such measure is water activity.

Water activity is a measure of the percent of water remaining in a baked product after it has been baked. Cracker products typically have a water activity in the range of about 0.35 to 0.50. Common baked goods, for example, bread, dinner rolls and pizza crusts, typically have a water activity in the range of about 0.90 to 0.98. The fully baked bread products of this invention preferably have water activities of about 0.90 to about 0.96, with a value of about 0.93 being particularly preferred. Such fully baked bread products (especially the hot dog buns as packaged as described herein) have satisfactory refrigeration storage characteristics as well as satisfactory texture and taste, whether unheated or heated, and whether eaten cold or warm.

The water activity of the bread product is measured after it has come out of the oven and cooled to about 100° F. Moisture content of the baked bread product may be measured with an aw meter, or by weight difference between the bread product after cooling to about 100° F. and after further, more complete drying (i.e., using a desiccator or other suitable and reliable method). Generally, the moisture content of fully baked bread product is about 89 to 99 percent, and preferably in the range of about 91 to about 93 percent.

Since yeast is included in the formulation of the bread dough, a fermentation or rising step is included in the dough preparation. The fermentation step allows the yeast to produce carbon dioxide gas which stretches and mellows the gluten contained in the flour, and aids in producing good flavor and texture. However, the large commercial baking operations such as will be used to prepare the bread products of the invention, fermenting all the dough to be baked requires large equipment outlays, is time consuming and is therefore costly. It has been found that in practicing the invention, one can produce a flavorful and texturally pleasing bread product by fermenting a portion of the dough and adding an aliquot of the fermented dough to bulk unfermented dough. The fermented dough is thoroughly mixed with the unfermented dough, and the resulting mixture is divided, cut to size, shaped, and baked. In the time period from mixing to baking, the dough mixture continues to rise and develop the desired characteristics. It has been found that a dough mixture containing about 2 to about 7 percent fermented dough and about 93 to about 98 percent unfermented dough produces satisfactory results. One preferred embodiment contains about 3 to about 5 percent fermented dough. Other preferred embodiments may contain up to 10 percent fermented dough.

The bread products of the present invention may be prepared using the dough formulations provided in U.S. Pat. Nos. 6,764,700 and 6,919,097 (both of which are incorporated by reference in their entireties). Although these dough formulations provide satisfactory bread products, it has been found that including several gums (e.g., xanthan and guar; typically with the xanthan at higher than conventional levels) and additional ingredients (e.g., methylcellulose) in the dough formulation provides an improved bread product. Thus, an especially preferred recipe (in baker's percentages) for the dough prepared according to a preferred embodiment of the invention is provided in the following table. This improved dough is especially preferred for the preparation of hot dog buns for use in the packaging described herein since it allows for the formation of a flexible "hinge" which remains flexible (i.e., does not break when the bun is opened) even after prolonged storage at refrigerated conditions.

| Ingredient | Range (% flour basis) | Preferred Range (% flour basis) | Most Preferred (% flour basis) |
|---|---|---|---|
| Flour | 100 | 100 | 100 |
| Compressed Yeast | 0.5-5.0 | 1.1-2.1 | 1.6 |
| Sodium Stearoyl Lactylate | 0-0.5 | 0.325-0.425 | 0.375 |
| Salt | 0.5-3.0 | 0.75-1.75 | 1.25 |
| High Fructose Corn Syrup | 5.0-15.0 | 8.5-12.5 | 10.5 |
| Calcium Propionate | 0-0.5 | 0.4-0.5 | 0.45 |
| Oil | 5.0-15.0 | 9.0-13.0 | 11.0 |
| Water | 50.0-63.0 | 53.0-60.0 | 56.0 |
| Monoglycerides/Diglycerides | 0.5-2.0 | 0.5-1.5 | 1.0 |
| Soy Flour | 0-3.0 | 0-1.0 | 0.25 |
| Whey | 0-6.0 | 0-1.0 | 0.25 |
| Lecithin | 0.2-1.5 | 0.4-0.6 | 0.5 |
| Xanthan | 0.1-1.0 | 0.25-0.45 | 0.35 |
| Guar | 0.2-1.5 | 0.4-0.6 | 0.5 |
| Alpha Amylase Enzyme | 0.1-0.45 | 0.3-0.35 | 0.32 |
| Methylcellulose | 0.2-1.5 | 0.3-0.6 | 0.5 |
| Diacetyl Tartaric Acid Esters of Monoglycerides | 0.1-0.5 | 0.3-0.6 | 0.5 |
| Spices/Seasonings/Flavors | 0-1.0 | 0-0.5 | 0.25 |

In other embodiments, other ingredients may be substituted for those listed above. For example, calcium stearoyl lactylate might be used in place of the sodium stearoyl lactylate, or other mold inhibitors could be used in place of, or combined with, calcium propionate. The flour is preferably hard wheat bread flour made from hard spring or winter wheat. Suitable oils include vegetable oils, shortening, hydrogenated fats or oil, and the like. Preferably the oil is a solid, hydrogenated or partially hydrogenated vegetable oil; for example, a hydrogenated or partially hydrogenated cottonseed, corn, soybean, sunflower, canola oil, or mixture thereof, and similar hydrogenated or partially hydrogenated vegetable oils and mixtures. The preferred vegetable oils are corn, canola, sunflower seed, cottonseed and soybean oils, or mixtures thereof, with soybean oil being the most preferred; oils such as Olestra™ and Benefat™ can also be used. The oil may have a butter flavoring agent added by the producer. Alternatively, a butter flavoring agent or other flavoring agent may be added to the recipe in an amount known to those skilled in the art or in accordance with the flavor manufacturer's recommendations. Dried yeast may be substituted for the compressed yeast used in the above basic recipe. If dried yeast is used, the baker's percentage or weight is reduced to account for the water content of the compressed yeast; likewise, the amount of water added may be increased to account for the water content of the compressed yeast. Therefore, if dried yeast is used in the above general recipe in place of dried yeast, the amount of dried yeast will be in the range of about 0.3 to about 1.7 percent, preferably about 0.6 to about 1 percent.

Turning now to more of the details of the films of the inner and outer wrappers 20 and 50 in accordance with one example of the food packaging system 10, each of the wrappers 20 and 50 has a film which forms the covers 28 and 64 and a forming film which forms the bases 22 and 52. The films for the covers 28 and 64 may be different, and specifically, thinner, than the bottom forming films. In addition, the bottom forming films may be selected to be thermoformable in order to make the compartments 26 and 59 of the bases during the manufacturing process. Some or all of the films may have anti-fog properties.

In one example of the food packaging system, the forming film for the base 52 of the outer wrapper 50 may be a coextruded film with an ethylene vinyl alcohol ("EVOH") barrier, polyethylene sealant and nylon structural layers. The film may have anti-fog properties, oxygen barrier properties and may have a nominal thickness of about 10 mils. An example of such a film is Curlon® Developmental X235-1281-B, sold by Curwood®, Oshkosh, Wis. The film for the cover 64 of the outer wrapper 50 may be a coextruded film with a polyester layer, an adhesive layer and an EVOH EZ Peel® ethylene vinyl acetate ("EVA") layer. The film may have anti-fog properties, oxygen barrier properties and may have a nominal thickness of about 2.6 mils. An example of such a film is Curlam® Developmental X235-1280-L, also sold by Curwood®. The forming film for the base 22 of the inner wrapper 20 may be a coextruded film with an EVOH barrier, polyethylene sealant and nylon structural layers. The film may have oxygen barrier properties and a nominal thickness of about 5 mils. An example of such a film is Curlon® Grade 9501-S, also sold by Curwood®. The film for the cover 28 of the inner wrapper 20 may be a coextruded film with a polyester layer, an adhesive layer and an EVOH EZ Peel® EVA layer. The film may have oxygen barrier properties and a nominal thickness of about 2.5 mils. An example of such a film is Curlam® Grade 1834-G, also sold by Curwood®. The sealing temperature between the forming films for the bases 22 and 52 and the films for the covers 28 and 64 may be at about 130° C.

Figure 6:
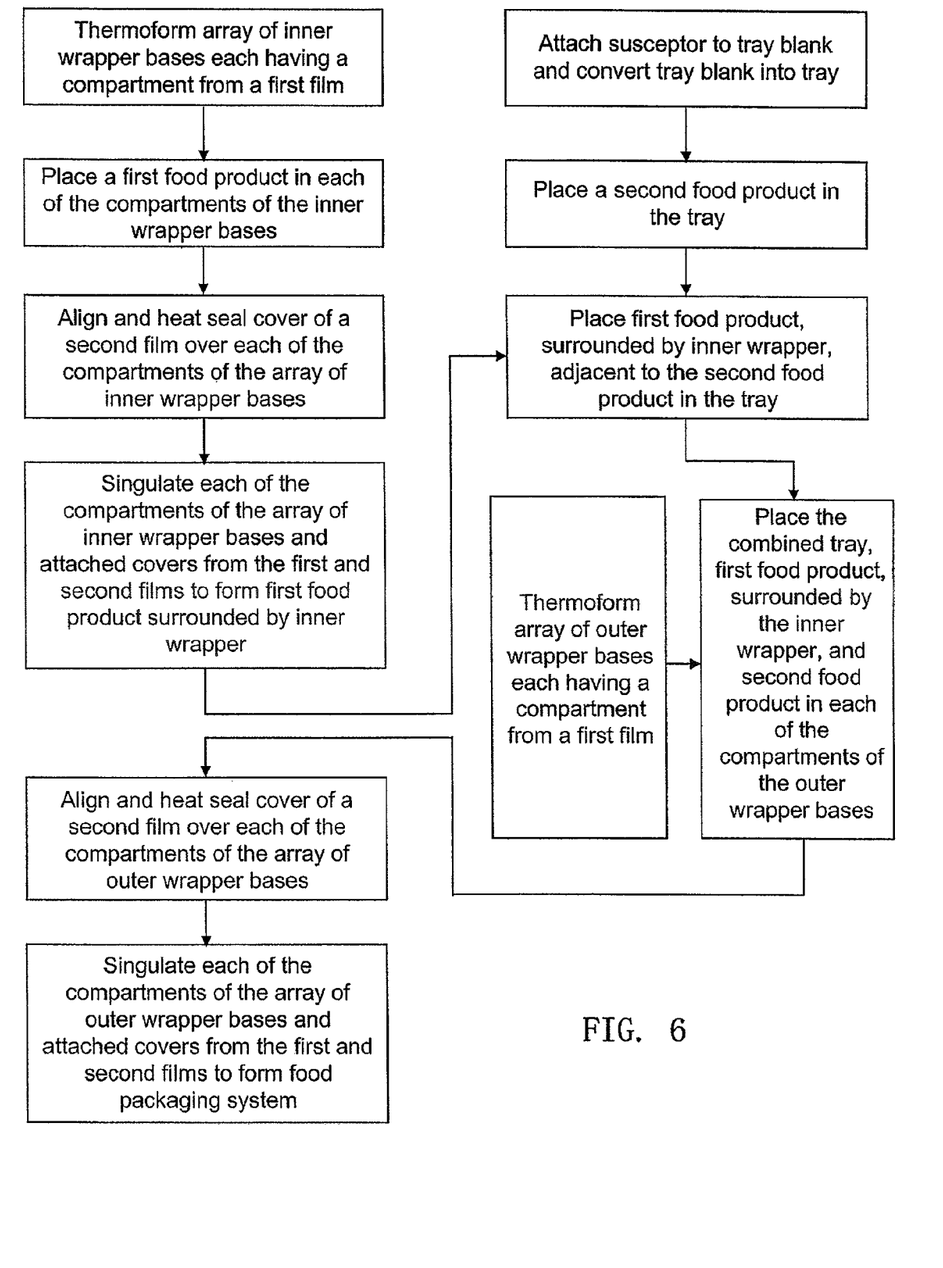
FIG. 6 is a diagram of a method of packaging food products in the packaging system of FIG. 1.

An example of a suitable manufacturing process, depicted in FIG. 6, for the packaging system 10 illustrated in FIGS. 1-5 includes three basic stages: (1) surrounding the first food product 12 with the inner wrapper 20; (2) assembling the tray 30 and placing the first food product 12, surrounded by the inner wrapper 20, and the second food product 14 in the tray 30; and (3) surrounding the tray 30, the first food product 12, surrounded by the inner wrapper 20, and the second food product 14 with the outer wrapper 50.

As discussed above, the inner wrapper 20 includes a base 22 having a compartment 26 and a cover 28. The compartment 26 of the base 22 is formed when a portion of a first film for forming the base 26 is heated and drawn into a mold cavity, such as by using a vacuum. Next, the first food product 12 is placed in the compartment 26 of the base 22. Following placement of the first food product 12 in the compartment 26 of the base 22, a second film for forming the cover 28 is brought into alignment with the first film, having the first food product 12 in the compartment 26, and sealed to the flanges 24 of the base 22 such that the first food product 12 is surrounded by the inner wrapper 20. A modified atmosphere, such as resulting from gas flushing, or vacuum is present in the sealed inner wrapper 20 to preserve the first food product 12. An array of the sealed inner wrappers 20 containing the first food product 12 may be formed in the first and second films, and individual first food products 12 in their inner wrappers 20 may be singulated from the array, such as by using a blade or other cutting tool.

Turning next to the assembly of the tray 30 and placing of the first food product 12, surrounded by the inner wrapper 20, and the second food product 14 in the tray 30, the tray 30 having the susceptor 40 thereon can be assembled into its erected configuration as discussed above in greater detail. Once assembled, the second food product 14 and first food product 12, surrounded by the inner wrapper 20, can be placed in the tray 30.

Once the first food product 12 has been placed in the inner wrapper 20 and the tray 30 and its contents have been assembled, the outer wrapper 50 can be formed and the tray 30 and its contents sealed therein. Similar to the inner wrapper 20, the outer wrapper 50 is formed from a first film for forming the base 52 and a second film for forming the cover 64. More specifically, the compartment 59 of the base 52 is formed in the first film by heating and drawing the first film into a mold cavity. After the compartment 59 of the base 52 is formed, the tray 30 and its contents can be placed therein. Following placement of the tray 30 and its contents in the compartment 59 of the base 52, the second film for forming the cover 64 is brought into alignment with the first film and sealed to the flanges 54 of the base 52 such that the tray 30 and its contents are surrounded by the outer wrapper 50. A modified atmosphere is placed within the sealed outer wrapper 50 to preserve the second food product 14. An array of the sealed outer wrappers 50 containing the tray 30 and its contents may be formed in the first and second films, and individual food packaging systems 10 may be singulated from the array, such as by using a blade or other cutting tool.

The modified atmosphere may be formed by gas flushing with carbon dioxide and nitrogen. For example, the gas contained in the sealed outer wrapper 50 may be about 80 percent carbon dioxide and 20 percent nitrogen. The relative percents of carbon dioxide and nitrogen, or other gasses, may be based upon the level of build-up of carbonic acid in the sealed outer wrapper 50. The amount of carbon dioxide can be decreased if the about amount of carbonic acid is high.

Several tests have been performed which illustrate certain advantages of the food packaging system 10 where the food packaging system 10 was refrigerated prior to heating in a microwave oven. In each of the tests, the designated items were heated for 35 seconds in a microwave oven having a power rating of 1100 Watts set on the high power setting. Following microwave heating, the designated items were left to rest for about 30 seconds prior to recording observations of the conditions of the designated items, and observations were again recorded after about 5 minutes. Each of the tests was repeated. In each of the tests, the first food product is a hot dog having a weight of about 2.0 ounces and the second food product is a hot dog bun having a weight of about 1.4 ounces and the formulation as set forth in detail herein. Prior to the tests, the food packaging systems 10, having a hot dog and a hot dog bun, were refrigerated at a temperature of about 40° F. The following terminology is used to identify parts of the hot dog bun:

Edge: outside surface of the bun at the hinge.

Inner Hinge: inside surface of the bun at the hinge.

Bottom: bottom half of the bun, the outside of which is in contact with a sidewall of the tray and the inside of which is in contact with the hot dog when the packaging system 10 is assembled.

Top: top half of the bun, the outside of which is in contact with a sidewall of the tray and the inside of which is in contact with the hot dog when the packaging system 10 is assembled.

Test 1.1

In this test, the designated items were a hot dog in a hot dog bun in a paperboard susceptor tray having a QuiltWave® susceptor on the majority of the bottom wall and pair of sidewalls. Following microwave heating and resting for 30 seconds, the hot dog bun was observed to be soft all over, with slight crisping where the bun was in contact with the susceptor. There was an absence of wet spots on the top and bottom of the bun. Following resting for 5 minutes, the hot dog bun was observed to be soft all over, with the crispiness maintained. The bottom of the hot dog bun was slightly firmer.

Test 1.2

In this test, the designated items were a hot dog in a hot dog bun in a paperboard susceptor tray having a QuiltWave® susceptor on the majority of the bottom wall and pair of sidewalls. Following microwave heating and resting for 30 seconds, the hot dog bun was observed to be soft all over, with slight crisping where the bun was in contact with the susceptor. There was an absence of wet spots on the top and bottom of the bun. There was slight moisture observed on the inside of the hot dog bun and are the susceptor. Following resting for 5 minutes, the hot dog bun was observed to have maintained its crispiness, the top and bottom of the hot dog bun were slightly firmer, and the hinge was soft and pliable. No flaking was observed on the surface of the hot dog bun.

Test 2.1

In this test, the designated items were a hot dog bun placed on a paper towel. Following microwave heating and resting for 30 seconds, the hot dog bun was observed to be soft all over with no crisping. There was moisture on the paper towel. Following resting for 5 minutes, the top of the hot dog bun was observed to be soft, the bottom of the bun was firmer and drier, and the bottom of the bun was starting to get crumbly.

Test 2.2

In this test, the designated items were a hot dog bun placed on a paper towel. Following microwave heating and resting for 30 seconds, the hot dog bun was observed to have a soft inside, with the bottom, edge and hinge being firm. Mositure was observed on the paper towel. Following resting for 5 minutes, the hot dog bun was observed to have its bottom, edge and hinge very firm, brittle and unpalatable. The bottom of the hot dog bun was dry and crumbly, the hinge was fractured, and the inside of the top half of the bun was soft.

Test 3.1

In this test, the designated items were a hot dog bun placed in a paperboard tray lacking a susceptor. Following microwave heating and resting for 30 seconds, the hot dog bun was observed to have a soft inside. There was no moisture observed on the paperboard tray. Following resting for 5 minutes, hard spots were observed on the top and bottom of the hot dog bun, and the top and bottom were dry and crumbly.

Test 3.2

In this test, the designated items were a hot dog bun placed in a paperboard tray lacking a susceptor. Following microwave heating and resting for 30 seconds, the hot dog bun was observed to have a soft inside. There was no moisture observed on the paperboard tray. The edge was slightly firm, and the hinge was tough. Following resting for 5 minutes, the inside of the hot dog bun was observed to be soft, the edge was firm, the hinge was tough, dry, brittle and beginning to fracture. There was no flaking on the surface of the hot dog bun.

Test 4.1

In this test, the designated items were a hot dog bun placed in a paperboard susceptor tray having a QuiltWave® susceptor on the majority of the bottom wall and pair of sidewalls. Following microwave heating and resting for 30 seconds, the hot dog bun was observed to have a soft inside, crisping where the bun was in contact with the susceptor, a soft top and bottom, and a slightly firm hinge. Following resting for 5 minutes, the hot dog bun was observed to have a soft inside, some hard spots on the top and bottom, a tough hinge and minor flaking on the top surface.

Test 4.2

In this test, the designated items were a hot dog bun placed in a paperboard susceptor tray having a QuiltWave® susceptor on the majority of the bottom wall and pair of sidewalls. Following microwave heating and resting for 30 seconds, the hot dog bun was observed to have a soft inside, slight crisping where the bun was in contact with the susceptor, toasted brown marks on the edge, and a slightly firm hinge. Following resting for 5 minutes, the hot dog bun was observed to have a soft inside, a slightly firmer edge and hinge, and the hinge was still pliable but leathery.

Test 5.1

In this test, the designated items were a hot dog bun placed in a paperboard tray lacking a susceptor but with a plastic film liner between the majority of the side and bottom walls of the tray and the hot dog bun. Following microwave heating and resting for 30 seconds, the hot dog bun was observed to have a slightly hard edge and a slightly tough hinge. A small amount of moisture was observed on the film. Following resting for 5 minutes, the hot dog bun was observed to have a firmer and drier bottom. The hinge fractured when the hot dog bun was opened.

Test 5.2

In this test, the designated items were a hot dog bun placed in a paperboard tray lacking a susceptor but with a plastic film liner between the majority of the side and bottom walls of the tray and the hot dog bun. Following microwave heating and resting for 30 seconds, the hot dog bun was observed to be soft all over, with a soft inside. The edge and hinge were slightly tough, and there was a small amount of moisture on the film. Following resting for 5 minutes, the hot dog bun was observed to be slightly firmer, have a soft inside, a firm but pliable edge and hinge, no flaking on the surface and no fracture at the hinge.

Test 6.1

In this test, the designated items were a hot dog in a hot dog bun placed in a paperboard tray with no susceptor. Following microwave heating and resting for 30 seconds, the hot dog bun was observed to be soft all over, and no excess moisture was present on the bun or the paperboard tray. Following resting for 5 minutes, the hot dog bun was observed to have a slightly firmer bottom, a soft top and bottom, a soft and pliable hinge, no hard spots, and some wet spots on inside of bun where there was contact with the hot dog.

Test 6.2

In this test, the designated items were a hot dog in a hot dog bun placed in a paperboard tray with no susceptor. Following microwave heating and resting for 30 seconds, the hot dog bun was observed to be soft all over, the hinge was soft and pliable, no moisture was present on the paperboard tray, slight moisture on the inside on the bun and no crisping. Following resting for 5 minutes, the hot dog bun was observed to be soft all over, the hinge was soft and pliable, slight moisture was on the inside of the bun and no crisping or flaking was present on the surface of the bun.

Test 7.1

In this test, the designated items were a hot dog in a hot dog bun placed on a paper towel. Following microwave heating and resting for 30 seconds, the hot dog bun was observed to be soft all over. There was some moisture on the paper towel, but less moisture than in Test 2.1. The hot dog bun was slightly firmer on the edge where the bun was in contact with the paper towel. Following resting for 5 minutes, the hot dog bun was observed to have a slightly firmer bottom, a soft and pliable hinge and slight moisture on the inside of the bun.

Test 7.2

In this test, the designated items were a hot dog in a hot dog bun placed on a paper towel. Following microwave heating and resting for 30 seconds, the hot dog bun was observed to be soft all over. There was some moisture on the paper towel, and there was slight moisture on the inside of the bun. Following resting for 5 minutes, the hot dog bun was observed to be slightly firmer but not dry. There was moisture on the paper towel, and the bottom of the bun was firmer and leathery.

Test 8.1

In this test, the designated items were a hot dog in a hot dog bun placed on a paperboard tray with no susceptor but with a plastic film liner between the majority of the side and bottom walls and the hot dog bun. Following microwave heating and resting for 30 seconds, the hot dog bun was observed to be soft all over. The bottom of the bun was wet, and there was some moisture on the plastic film. Following resting for 5 minutes, the edge of the hot dog bun was observed to be soggy. There were no hard spots on the hot dog bun, but the inside was observed to have wet spots.

Test 8.2

In this test, the designated items were a hot dog in a hot dog bun placed on a paperboard tray with no susceptor but with a plastic film liner between the majority of the side and bottom walls and the hot dog bun. Following microwave heating and resting for 30 seconds, the hot dog bun was observed to be very soft all over, with a wet and lightly soggy edge, some moisture on the inside and some moisture on the plastic film. Following resting for 5 minutes, the hot dog bun was observed to have a soggy edge, moisture on the inside and a soft hinge. Moisture was present on the film liner.

Test 9.1

In this test, the designated items were a hot dog in a hot dog bun placed on a paperboard tray with a susceptor on the majority of the side and bottom walls. Following microwave heating and resting for 30 seconds, the hot dog bun was observed to be soft all over, slight crisping where the bun was in contact with the susceptor, and some moisture on the susceptor. Following resting for 5 minutes, the hot dog bun was observed to have a slightly moist edge, maintain crispiness where the bun was in contact with the susceptor, moisture was present on the susceptor, slight flaking was on the top, and no hard spots were present.

Test 9.2

In this test, the designated items were a hot dog in a hot dog bun placed on a paperboard tray with a susceptor on the majority of the side and bottom walls. Following microwave heating and resting for 30 seconds, the hot dog bun was observed to have a soft and pliable hinge, slight crisping where the bun was in contact with the susceptor and a very small amount of moisture on the inside. Following resting for 5 minutes, the hot dog bun was observed to have a small amount of moisture on the inside, a soft and pliable hinge. The hot dog bun was slightly firmer with no flaking, and maintained its crispiness. Moisture was present on the susceptor.

Test 10.1

In this test, the designated items were a hot dog in a hot dog bun placed on a paperboard tray with a Quiltwave susceptor only on the bottom wall. Following microwave heating and resting for 30 seconds, the hot dog bun was observed to be soft all over, have a slightly moist edge and no crisping. Following resting for 5 minutes, the hot dog bun was observed to be soft all over, have a slightly moist edge, moisture on the inside, with slight flaking and firmness present on the edge where the bun was in contact with the susceptor.

Test 10.2

In this test, the designated items were a hot dog in a hot dog bun placed on a paperboard tray with a Quiltwave susceptor only on the bottom wall. Following microwave heating and resting for 30 seconds, the hot dog bun was observed to be soft all over, have a slightly moist inside, browning on the edge, a soft hinge, no flaking and slight moisture was present on the susceptor. Following resting for 5 minutes, the hot dog bun was observed to be soft all over, have a slightly moist edge, moisture on the inside, with slight flaking and firmness present on the edge where the bun was in contact with the susceptor.

Test 11.1

In this test, the designated items were a hot dog bun placed on a paperboard tray with a susceptor on the majority of the side and bottom walls. Following microwave heating and resting for 30 seconds, the hot dog bun was observed to be hard and have toasted marks on the edge, with a tough hinge. Following resting for 5 minutes, the hot dog bun was observed to have a dry and tough edge and hinge.

Test 11.2

In this test, the designated items were a hot dog bun placed on a paperboard tray with a susceptor on the majority of the side and bottom walls. Following microwave heating and resting for 30 seconds, the hot dog bun was observed to be soft all over, have crisping where the bun was in contact with the susceptor, and no moisture was present on the susceptor. The hot dog bun was firmer than in Tests 9.1 and 9.2 where there was included a hot dog. Following resting for 5 minutes, the hot dog bun was observed to have a dry and tough edge and hinge.

Several conclusions can be drawn from the above-described tests. One conclusion is that some of the moisture from the hot dog is transferred to the hot dog bun during heating in the microwave oven and advantageously can reduce excessive drying of the hot dog bun during heating. In particular, the moisture transfer can reduce excessive drying at the hinge of the hot dog bun. Another conclusion is that the susceptor may advantageously block microwave energy from heating portions of the sides and bottom of the hot dog bun, thereby reducing the amount of moisture that is dissipated from the hot dog bun during microwave heating. Yet another conclusion is that venting adjacent the bottom and sides of the hot dog bun during heating in the microwave oven can advantageously reduce moisture condensation on the outside of the tray, minimize a scaly texture on the hot dog bun, and in particular on the top side of the hot dog bun, and minimize moisture on the bottom of the hot dog bun, such as during resting. Yet another conclusion is that overheating from a frozen state can result in unappealing hot dogs and hot dog buns. Yet another conclusion from the tests is that venting adjacent the bottom and sides of the hot dog bun during heating in the microwave oven can minimize moisture on the bottom of the hot dog bun, such as during resting.

The drawings and the foregoing descriptions are not intended to represent the only forms of the food packaging system in regard to the details of construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation.

The invention claimed is:

1. A fully baked microwavable bread product, said fully baked bread product being prepared from a dough comprising, in baker's percentages, 100 percent flour, about 0.5 to about 5 percent compressed yeast, 0 to about 0.5 percent sodium stearoyl lactylate, about 0.5 to about 3 percent salt, about 5 to about 15 percent high fructose corn syrup, 0 to about 0.5 percent calcium propionate, about 5 to about 15 percent oil, about 50 to about 63 percent water, about 0.5 to about 2 percent monoglycerides and diglycerides, 0 to about 3 percent soy flour, 0 to about 6 percent whey, about 0.2 to about 1.5 percent lecithin, about 0.1 to about 1 percent xanthan, about 0.2 to about 1.5 percent guar gum, about 0.1 to about 0.45 percent alpha amylase enzyme, about 0.2 to about 1.5 percent methylcellulose, about 0.1 to about 0.5 percent diacetyl tartaric acid esters of monoglycerides, and 0 to about 1 percent spices, seasonings, and flavors; wherein the fully baked bread product has an Aw of about 0.90 to about 0.98, wherein the fully baked bread product has a refrigerated shelf life prior to microwave heating of at least about 75 days when sealed in a polymeric film package and stored at about 40° F.

2. The fully baked bread product of claim 1, wherein the fully baked bread product is a hot dog bun having a hinged section connecting two bun parts and wherein the hinged section of the hot dog bun remains flexible during its shelf life and after microwave heating.

3. The fully baked bread product of claim 1, wherein the dough comprises, in baker's percentages, 100 percent flour, about 1.1 to about 2.1 percent compressed yeast, about 0.325 to about 0.425 percent sodium stearoyl lactylate, about 0.75 to about 1.75 percent salt, about 8.5 to about 12.5 percent high fructose corn syrup, about 0.4 to about 0.5 percent calcium propionate, about 9 to about 13 percent oil, about 53 to about 60 percent water, about 0.5 to about 1.5 percent monoglycerides and diglycerides, 0 to about 1 percent soy flour, 0 to about 1 percent whey, about 0.4 to about 0.6 percent lecithin, about 0.25 to about 0.45 percent xanthan, about 0.4 to about 0.6 percent guar, about 0.3 to about 0.35 percent alpha amylase enzyme, about 0.3 to about 0.6 percent methylcellulose, about 0.3 to about 0.6 percent diacetyl tartaric acid esters of monoglycerides, and 0 to about 0.5 percent spices, seasonings, and flavors.

4. The fully baked bread product of claim 1, wherein the dough comprises, in baker's percentages, 100 percent flour, about 1.1 to about 2.1 percent compressed yeast, about 0.325 to about 0.425 percent sodium stearoyl lactylate, about 0.75 to about 1.75 percent salt, about 8.5 to about 12.5 percent high fructose corn syrup, about 0.4 to about 0.5 percent calcium propionate, about 9 to about 13 percent oil, about 53 to about 60 percent water, about 0.5 to about 1.5 percent monoglycerides and diglycerides, 0 to about 1 percent soy flour, 0 to about 1 percent whey, about 0.4 to about 0.6 percent lecithin, about 0.25 to about 0.45 percent xanthan, about 0.4 to about 0.6 percent guar, about 0.3 to about 0.35 percent alpha amylase enzyme, about 0.3 to about 0.6 percent methylcellulose, about 0.3 to about 0.6 percent diacetyl tartaric acid esters of monoglycerides, and 0 to about 0.5 percent spices, seasonings, and flavors.

5. A fully baked microwavable hot dog bun, said fully baked hot dog bun being prepared from a dough comprising, in baker's percentages, 100 percent flour, about 0.5 to about 5 percent compressed yeast, 0 to about 0.5 percent sodium stearoyl lactylate, about 0.5 to about 3 percent salt, about 5 to about 15 percent high fructose corn syrup, 0 to about 0.5 percent calcium propionate, about 5 to about 15 percent oil, about 50 to about 63 percent water, about 0.5 to about 2 percent monoglycerides and diglycerides, 0 to about 3 percent soy flour, 0 to about 6 percent whey, about 0.2 to about 1.5 percent lecithin, about 0.1 to about 1 percent xanthan, about 0.2 to about 1.5 percent guar gum, about 0.1 to about 0.45 percent alpha amylase enzyme, about 0.2 to about 1.5 percent methylcellulose, about 0.1 to about 0.5 percent diacetyl tartaric acid esters of monoglycerides, and 0 to about 1 percent spices, seasonings, and flavors; wherein the fully baked hot dog bun has an Aw of about 0.90 to about 0.98, wherein the hot dog bun has a hinged section connecting two bun parts, and the methyl cellulose, xanthan gum and guar gum provide a hot dog bun having a hinged section that remains flexible during its shelf life and after microwave heating for about 20 to about 45 seconds and wherein the fully baked hot dog bun has a refrigerated shelf life prior to microwave heating of at least about 75 days when sealed in a polymeric film package and stored at about 40° F.

6. The fully baked hot dog bun of claim 5, wherein the dough comprises, in baker's percentages, 100 percent flour, about 1.1 to about 2.1 percent compressed yeast, about 0.325 to about 0.425 percent sodium stearoyl lactylate, about 0.75 to about 1.75 percent salt, about 8.5 to about 12.5 percent high fructose corn syrup, about 0.4 to about 0.5 percent calcium propionate, about 9 to about 13 percent oil, about 53 to about 60 percent water, about 0.5 to about 1.5 percent monoglycerides and diglycerides, 0 to about 1 percent soy flour, 0 to about 1 percent whey, about 0.4 to about 0.6 percent lecithin, about 0.25 to about 0.45 percent xanthan, about 0.4 to about 0.6 percent guar, about 0.3 to about 0.35 percent alpha amylase enzyme, about 0.3 to about 0.6 percent methylcellulose, about 0.3 to about 0.6 percent diacetyl tartaric acid esters of monoglycerides, and 0 to about 0.5 percent spices, seasonings, and flavors.

* * * * *